Jan. 15, 1929.

E. J. MURPHY

MAGNETO MECHANICAL DRIVING SYSTEM

Filed Feb. 4, 1921  2 Sheets-Sheet 1

Inventor:
Edwin J. Murphy,
by
His Attorney.

Jan. 15, 1929.  1,699,115
E. J. MURPHY
MAGNETO MECHANICAL DRIVING SYSTEM
Filed Feb. 4, 1921   2 Sheets-Sheet 2
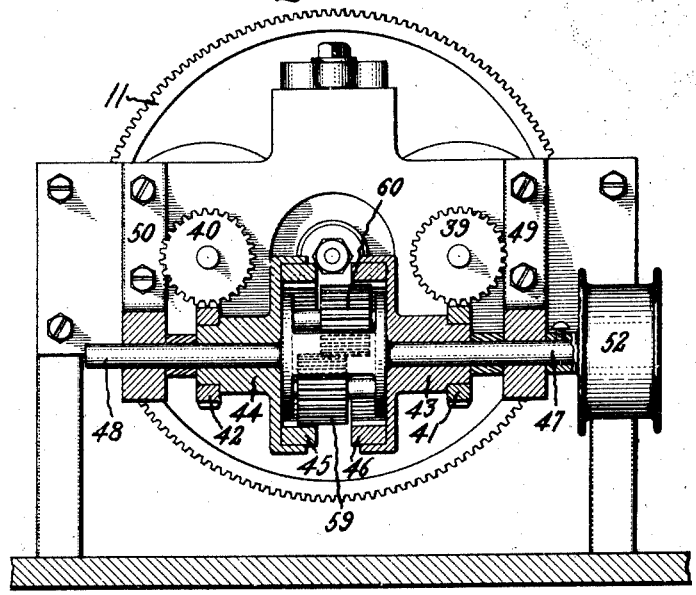
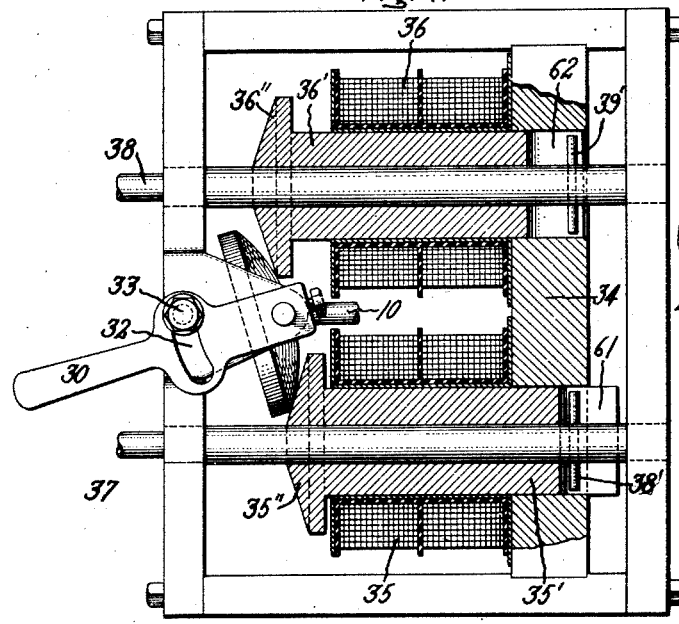
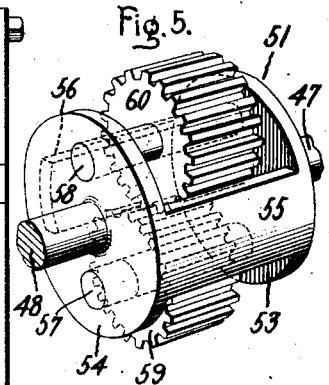
Inventor:
Edwin J. Murphy,
by
His Attorney.

Patented Jan. 15, 1929.

1,699,115

UNITED STATES PATENT OFFICE.

EDWIN J. MURPHY, OF SCHENECTADY, NEW YORK, ASSIGNOR TO GENERAL ELECTRIC COMPANY, A CORPORATION OF NEW YORK.

MAGNETO-MECHANICAL DRIVING SYSTEM.

Application filed February 4, 1921. Serial No. 442,486.

My invention has reference to a magneto-mechanical driving system being a method of and mechanism for transmitting motion from a driving shaft rotating continuously with constant speed in one direction, to a driven shaft in such manner that it may rotate at the will of the operator in one or in the opposite direction with a selected speed, the range of speed in either direction being between a certain maximum and zero.

I accomplish this result by causing the driving shaft to transmit by magnetic action two opposite and selectively differential speeds to two rotary elements, and to react by the latter upon the driven shaft in such manner that it will rotate in response to the preponderating speed, and when the two speeds are equal the driven shaft will stand still. The integration of the opposed speeds to a resultant speed in one direction is effected by two gears (pinions) in mesh, each receiving a planetary movement the revolutionary elements of which are in the same direction, while the rotary elements of the same are opposed in direction and receive primarily different speed impulses. These differing rotary speed impulses are, by reason of the mesh of the gears, equalized from moment to moment, and it is this equalizing action which causes the integration to a resultant speed.

Figure 1:
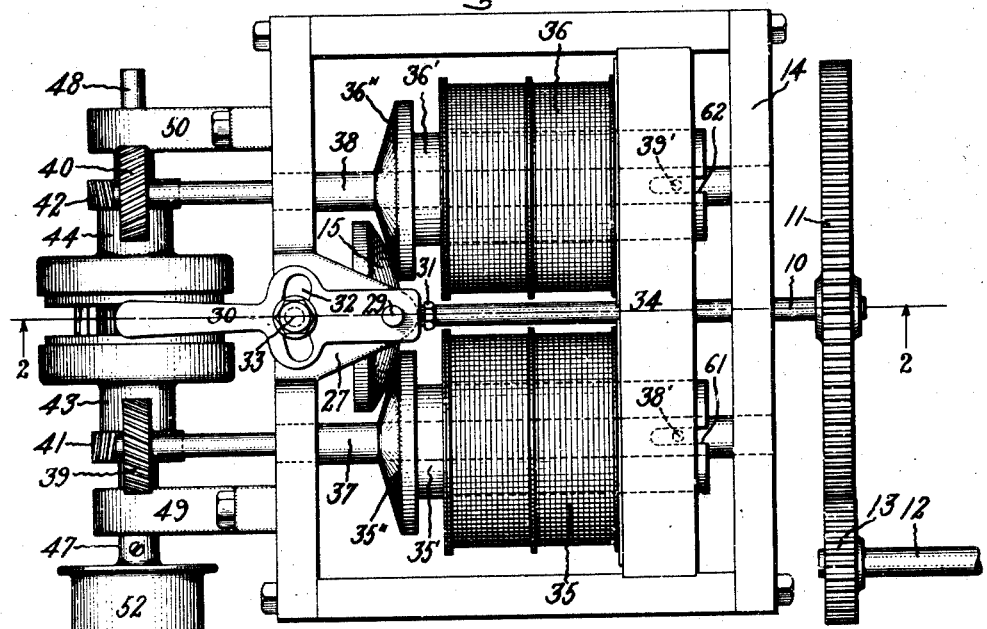
Figure 2:
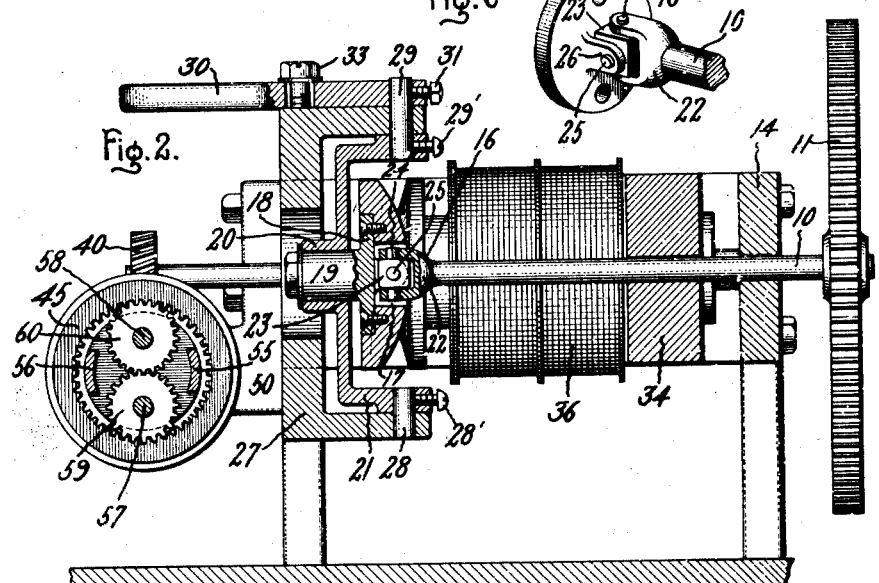

All this will more fully appear from the following detailed description with reference to the accompanying drawings which illustrat one form of apparatus which is adapted for the practice of the invention, as follows:

Fig. 1 is a top plan view; Fig. 2 a sectional view on line 2—2 of Fig. 1; Fig. 3 an end view, partly in section; Fig. 4 a plan view of the central part of the apparatus showing the magnets in section; Fig. 5 a perspective view of a squirrel cage structure which constitutes a part of the apparatus; and Fig. 6 a perspective view of a universal coupling.

In the form of the embodiment of the invention shown in the drawing, a driving shaft 10, carries a gear 11, which receives motion from any kind of prime-motor through the shaft 12 and pinion 13. The shaft 10 has near one end a bearing in a frame 14 and carries at its other end a body of revolution 15, joined to the shaft by a universal coupling indicated as a whole in Fig. 2, by the numeral 16; the details of the universal coupling will be described further on. This coupling is housed in a wide central bore 17 in the body of revolution and the latter is countersunk at the rear and is there closed by a plate 18 from which a short but rather stout shaft 19 extends rearwardly which has its bearing in a boss 20 projecting from a frame 21. It will be seen that with this construction the short shaft 19 is, in effect, a continuation of the driving shaft, connected with the latter by the universal coupling 16.

The body of revolution 15 is of magnetic material; it may be generated by the rotation of a segment of any suitable curve about any axis in the plane of the curve. This body is, therefore, a toroid and will hereinafter be referred to by this designation. For reasons which will be explained further on the generating curve of the toroid should be a segment of a logarithmic spiral in order to give the theoretically best results, but I have found that a short segment of a circle only very slightly deviates from a short segment of such curve and is quite practicable.

The rear end of the shaft 10 is enlarged at 22, and enters freely the bore in the toroid. This enlargement is recessed and a cubical block 23 is located in the recess. Two pairs of stout pins, 24, 24, 25, 25 project from the cube at right angles to each other, and by one of these pairs of pins 24, 24, the block is pivoted in the enlargement 22, while the other pair 25, 25, pivot the block in a pair of ears 26, 26, projecting from the plate 18 over the block. By this construction the shaft 10 is universally joined to the toroid, but any other properly designed universal joint may be used.

The frame 21 is pivoted by pins 28, 29, to a double armed bracket 27, which is supported by or may be integral with the frame 14. The pins 28, 29, are clamped to the frame 21 by screws 28', 29', but pass freely through the arms of bracket 27; and over the upper arm of the bracket extends a hand lever 30, secured to pin 29 by a screw 31. The hand lever has a curved slot 32 through which a set screw 33 passes into the bracket 27. This construction permits the adjustment and setting of the frame 21 and with it of the toroid 15 at an angle to the shaft 10, as indicated in Fig. 4, the universal joint freely yielding to such adjustment.

To a cross-bar 34 of magnetic material attached to frame 14 are secured two spaced solenoids 35, 36, through which loosely pass the magnetic plungers 35', 36', terminating at one end in the cones 35'', 36'', respectively, the surfaces of the cones facing the surface of the toroid on opposite sides of the pivotal pins 25. A shaft 37, journaled in the frame 14 passes loosely through plunger 35' and a like shaft 38 passes through plunger 36', and each plunger has at the rear end a diametric slot 61 and 62 into which pins 38', 39', which are fast in the shafts 37, 38, extend. In this manner the plungers may rotate the shafts and have at the same time free axial movement upon the same. The magnetic circuit, including cross bar 34, the plungers 35', 36', cones 35'', 36'', and toroid 15, is short and perfect.

As thus far described the apparatus may be used for the practice of two steps of my improved method.

Suppose the parts are in the position indicated in Fig. 1, that is to say, the toroid is in its central adjustment so that the same wide part of each cone surface faces the same zone of the toroid. If now the solenoids are energized by closing their circuits to a generator (not indicated), the movable plungers will be attracted to the toroid so that magnetic contacts between the cones and the toroid are established. If, at the same time, the driving shaft is rotated in a given direction with uniform speed, the toroidal surface will impart frictionally a like speed to the two cones and to their shafts, but the rotations of both of these shafts will be in a direction opposite to that of the driving shaft, and if these two equal rotations are in accordance with my invention integrated and their resultant is imposed upon a third shaft (a driven shaft), the latter will not move at all. If the adjustment of position of the toroid is changed, as, for instance, to that indicated in Fig. 4, where a narrow zone of it bears upon a wide part of cone 36'' and a wide zone of the toroid bears upon a narrow part of the cone 35'', the two cones and their shafts will receive different speeds and still in the same directions, and if these speeds are in accordance with my invention integrated and the resultant is imposed upon a driven shaft, the latter will rotate in response to the preponderating speed.

How, in accordance with my invention, the two speeds of the shafts 37, 38, are integrated and the resultant speed is imposed upon a driven shaft, will now be described.

The shafts 37, 38, are extended beyond the frame 14 and carry at their free ends the spiral gears 39, 40, respectively, meshing with the gears 41, 42, each on a separate boss, 43, 44, and each boss carries at the end remote from the gears 41, 42, respectively, an internal gear, one of which is marked with the letter 45 and the other with the letter 46. As shown in Fig. 1, the spirals of gears 39, 40 are oppositely pitched with reference to each other, consequently the gears 41, 42 will be rotated with reference to each other in opposite directions. The internal gears are spaced apart but are parallel with each other as shown in Fig. 3, and both, together with the bosses 43, 44, and gears 41, 42, are loose on the shaft sections 47, 48, which are in alignment and are journaled in the hangers 49 and 50, respectively. The two shaft sections are coupled together by a squirrel cage 51, which is best shown in Fig. 5, so that the two shaft sections constitute in effect a single shaft which is the driven shaft of my apparatus and from which power may be transmitted in any suitable manner, as, for instance, by a pulley 52.

From the foregoing it is clear that the two internal gears rotate in opposite directions and with speeds that may be either equal or unequal, according to the position of adjustment given to the toroid by means of the hand lever 30.

The squirrel cage 51 is composed of two parallel discs 53, 54, joined by two webs 55, 56, and in addition thereto by two short counter shafts 57, 58, journaled in the discs and each carrying a pinion 59, 60, respectively, the two pinions being of the same diameter and in mesh with each other, and one of them is in mesh with one of the internal gears at one end of the diameter of the latter and the other with the second internal gear at the opposite end of the diameter of the latter. Consequently the pinions revolve in the same direction. The driving shaft sections are centrally secured to the end discs of the squirrel cage.

The operation of the squirrel cage structure, in conjunction with the internal gears and their magnetic friction drives will now be readily understood.

If the internal gears rotate with the same speed (but in opposite directions), one of them will rotate directly one of the pinions, say pinion 59, about its axis, in one direction and the other internal gear will directly rotate the other pinion 60, about its axis, in the opposite direction, and this will agree with the relative rotary directions of the two pinions which they receive indirectly owing to the face that they are in mesh. In other words, each pinion will be rotated freely about its axis as if the other pinion were absent, and no strain or torque will be exerted upon the squirrel cage and the driven shaft. But if the speed of one internal gear is greater than that of the other, one of the pinions, say pinion 59, will receive a tendency to be directly rotated about its axis faster than pinion 60; but these pinions being in mesh, pinion 59 will tend to accelerate pinion 60, and pinion 60 will tend to retard pinion 59. The acceleration of pinion 60, seeing that it is in mesh with internal gear 45, can only take place by rolling upon its internal gear in the direction of the rotation of the latter. Likewise, the retardation of pinion 59 can only take place by rolling upon internal gear 46 in a direction opposed to the direction of rotation of the latter. The resultant couple of forces is equal to the difference between the two direct axial speeds of the pinions, which in turn are functions of the speeds of the internal gears, and the squirrel cage and driven shaft will therefore be rotated in response to the preponderating speed of one of the internal gears. This operation is ultimately due to the fact that each of the pinions receives a planetary movement the revolutionary parts of which (about the common axis of the two internal gears, the squirrel cage and driven shaft) are in the same direction for both, while the rotary parts of these movements about the axes of the pinions are opposed in direction.

When the toroid is shifted from one position to another by the manipulation of the hand lever 30, it is important that there be no impediment to such shifting by reason of the powerful magnetic hold of the cones 35″, 36″, upon the magnetic toroid; and for this reason the surface of the toroid should be such that its radial movement over the cones be a rolling one as distinguished from a sliding movement. It is for this purpose that the toroid is by preference generated by a segment of a logarithmic spiral.

While I have described an apparatus which is well adapted to the practice of my invention, many changes in details can be made by persons skilled in the art without deviating from the invention.

What I claim as new and desire to secure by Letters Patent of the United States, is:—

1. In a friction drive a driven first element and a driven second element, a driving element mounted to rotate about two different axes whereby the first and second elements may be rotated by rotating the driving element about one of its axes and whereby the ratio of rotation between the driven elements may be varied by rotating the driving element about its other axis the axes of rotation of each of the driven elements being parallel.

2. In a friction drive a driven first element and a driven second element, a driving element mounted to rotate about two different axes whereby the first and second elements may be rotated by rotating the driving element about one of its axes and whereby the ratio of rotation between the driven elements may be varied by rotating the driving element about its other axis, and electromagnetic means for controlling the traction between the driving and driven elements, the driving element being in friction engagement with the driven elements the axes of rotation of each of the driven elements being parallel.

3. A friction drive comprising a driving element and two driven elements in frictional engagement with the driving element the driving element being mounted to rotate about two different axes, one to rotate the driven elements and the other to change the ratio of rotation between the elements, each driven element being mounted to rotate about an independent axis and each mounted also to move in a direction parallel to its axis of rotation whereby traction may be preserved between the driving and the driven elements while the ratio of rotation between the driven elements is being varied with respect to each other, and electromagnetic means for affecting the traction between the driving and driven elements.

4. A driving mechanism comprising a driving element and two driven elements, each element being mounted on a separate shaft, each of said elements being mounted to rotate about the axis of its shaft, each of the driven elements being mounted to move also in a direction parallel to its axis of rotation, and the driving element being mounted to also rotate about an axis transverse its shaft, and means for preserving traction between the driving element and the driven elements at all times, whereby the ratio of rotation of the two driven elements may be varied.

5. A driving mechanism comprising a driving element and two driven elements, each element being mounted to rotate on a separate shaft, each of said elements being mounted to rotate about the axis of its shaft, each of the driven elements being mounted to move in a direction parallel to its axis of rotation, and the driving element being mounted to also rotate about an axis transverse its shaft, and means for preserving traction between the driving element and the driven elements at all times, the elements being so mounted that when one driven element moves in one direction parallel to its axis the other driven element moves parallel to its axis in the reverse direction, whereby the ratio of rotation of the two driven elements may be varied.

In witness whereof, I have hereunto set my hand this 3rd day of February, 1921.

EDWIN J. MURPHY.